(12) United States Patent
Tulkki (10) Patent No.: US 7,809,212 B2
(45) Date of Patent: Oct. 5, 2010

(54) DIGITAL MOSAIC IMAGE CONSTRUCTION

(75) Inventor: Jarno Tulkki, Kempele (FI)

(73) Assignee: Hantro Products Oy, Oulu (FI)

( * ) Notice: Subject to any disclaimer, the term of this patent is extended or adjusted under 35 U.S.C. 154(b) by 958 days.

(21) Appl. No.: 11/641,843

(22) Filed: Dec. 20, 2006

(65) Prior Publication Data

US 2008/0152258 A1    Jun. 26, 2008

(51) Int. Cl.
*G06K 9/36* (2006.01)
(52) U.S. Cl. .................. 382/284; 382/274; 382/275; 382/294
(58) Field of Classification Search .............. 382/274, 382/275, 282, 284
See application file for complete search history.

(56) References Cited

U.S. PATENT DOCUMENTS

| | | | |
|---|---|---|---|
| 6,324,540 B1 * | 11/2001 | Khanna et al. | 707/102 |
| 6,330,344 B1 * | 12/2001 | Kondo et al. | 382/107 |
| 6,385,245 B1 * | 5/2002 | De Haan et al. | 375/240.16 |
| 6,449,312 B1 * | 9/2002 | Zhang et al. | 375/240.16 |
| 6,483,874 B1 * | 11/2002 | Panusopone et al. | 375/240.08 |
| 6,700,934 B2 * | 3/2004 | Lin | 375/240.16 |

* cited by examiner

*Primary Examiner*—Yosef Kassa
(74) *Attorney, Agent, or Firm*—Young & Thompson (57) ABSTRACT

Digital mosaic image construction with an apparatus, method, computer program, and integrated circuit is disclosed. In the method, a first digital image and a second digital image are obtained, and a global motion vector is defined between the first digital image and the second digital image. Next, a mosaic image is combined from the first digital image and the second digital image utilizing the relative locations of the first and second digital images with each other as expressed by the global motion vector.

9 Claims, 10 Drawing Sheets

DIGITAL MOSAIC IMAGE CONSTRUCTION

FIELD

The invention relates to digital mosaic image construction with an apparatus, method, computer program, and integrated circuit.

BACKGROUND

A mosaic traditionally refers to a decoration art originating, as far as is known, from ancient Greece. It deals with covering surfaces, such as floors, ceilings, pottery, etc. with small pieces of differently colored objects, such as stones and pieces of glass. In digital imaging, a mosaic image refers to an image constructed from several other images, piece by piece. Usually the mosaic image is larger than the original images. The mosaic image may be made by "melting" individual images together.

A panorama refers to a wide view image of a scene. Normally only one of the two dimensions is widened: typically the horizontal view is much wider than the vertical view. Panoramic images have long been made by various different mechanical camera solutions: wide-angled objectives, mirrors, lenses and rotating cameras, for instance. The digital revolution, however, has changed the scene and today panoramic images are created mainly with image stitching applications running in personal computers. So, we may say that the panorama is a sub-type of a mosaic image, enlarged mostly in horizontal dimension.

Due to another aspect of the digital revolution—the exponential increase of digital cameras in all kinds of mobile apparatuses—more and more occasional photographers leave their camera equipment home because they are carrying a mobile phone or some other hand-held device, which includes a camera and a processor. Why not create a panoramic image in real time with that mobile phone? It would be much easier, saving work, time and the phone's memory, than to do it later at home.

When creating a panoramic image, why should the image be spread only in the horizontal direction? Why should the user not be given the opportunity to shoot as big an image as he/she wishes in both dimensions?

As more dimensions are taken into account, why should the last one not be taken into account too, thus enabling the creation of three-dimensional mosaic images.

BRIEF DESCRIPTION

The present invention seeks to provide an improved apparatus, method, computer program, and intergrated circuit.

LIST OF DRAWINGS

Embodiments of the present invention are described below, by way of example only, with reference to the accompanying drawings, in which.

DESCRIPTION OF EMBODIMENTS

In mosaic image formation, the placement of pictures in relation to each other has to be identified. If one wants to stitch two pictures together, their relative locations have to be known.

A global motion vector definition method (U.S. patent application Ser. No. 11/172,972) invented by the Applicant may be used to identify the relative locations. This method, unlike the others, is not related to a prior art motion estimation algorithm at all, but introduces a totally new and different approach for global motion vector calculation. Based on the interesting fact about the maps: there is one and only one point on the map that lies over the same spot that it represents, the method utilizes a pair of "maps" taken from consecutive images of a video sequence, for instance: a "map" of a search area and a "map" of a block, whose scales differ from each other, forming the map situation mentioned above. If a map has one and only one pixel that represents the spot where it lies, then, when computing differences between two differently scaled maps, that spot is zero, for the pixel's difference to itself is zero. Even if it is not that simple in reality, because video images not only move but also change, the theory is suitable and efficient when numerous maps are combined together.

Figure 1A:
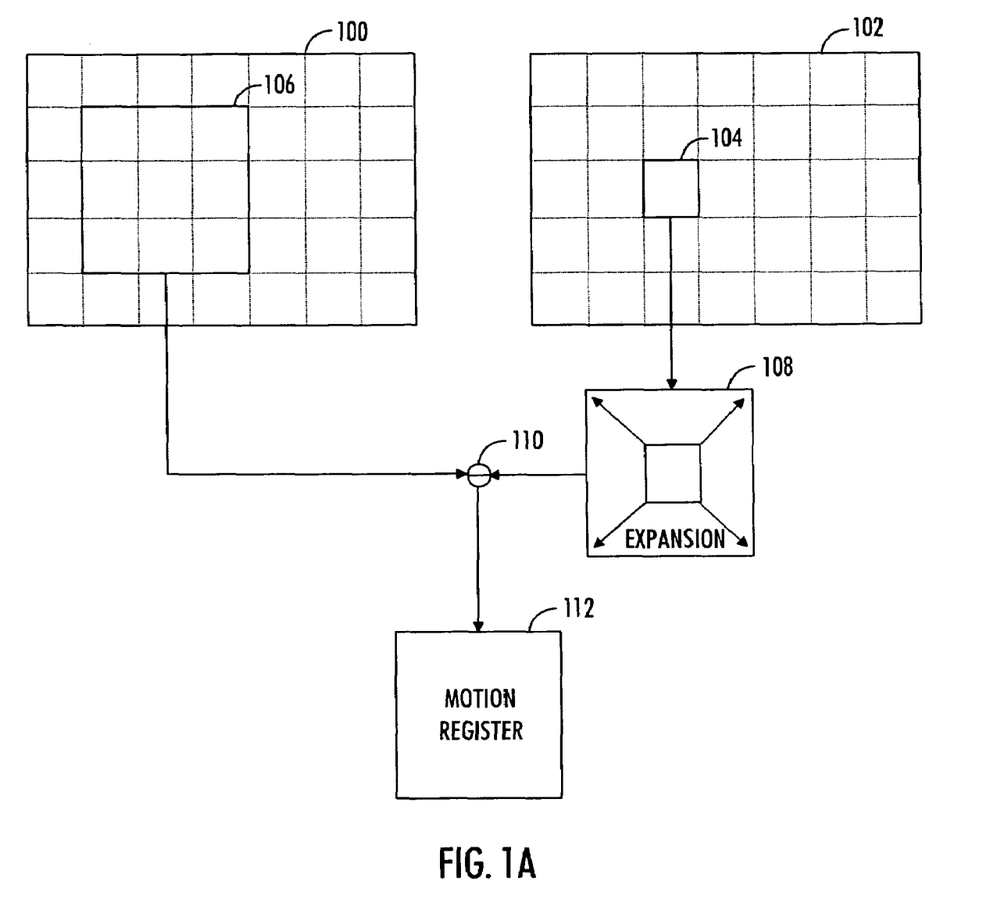
FIG. 1A is an overview of the general motion definition method.

FIG. 1A describes an overall simplified scene of the global motion vector definition process: when defining a global motion vector between two consecutive digital images or frames, a previous frame 100 and a present frame 102 on the video sequence, the present image 102 is divided into blocks 104, and for each block 104 a search area 106 wider than the block 104 is defined in the previous image 100. The block 104 is then expanded into the size of the search area 106 forming an "inverse" map 108 of the block 104. "Inverse" here refers to the fact that normally a map is smaller than the area it represents, while in the present case, the map 108 is actually larger than the block 104. After expansion, the algorithm calculates absolute difference values 110 of the related pixels of these two pixel matrices 106 and 108 and arranges them into the motion register 112. After processing every block in image 104, a topographic map of the motion between the frames 100 and 102 is formed into the register 112, where the minimum value shows the desired global motion vector between the frames. For equal-sized images, like 100 and 102, this brings a minor problem: how to deal with the edge blocks of the frame 102 when the search area 106 exceeds the edge of the frame 100? Fortunately, there are several practical solutions: to copy the edge pixels of the frame 100 to fill the search area or to ignore the edge blocks of the frame 102 when the frame 102 is large enough, etc.

It is noteworthy that the present image 102 and the previous image 100 may be in the opposite order: the backward "motion estimation" is then just turned into the forward "motion estimation". On the other hand, the reference image, i.e. the previous image, may also be any other frame for which the global motion vector is to be defined.

Furthermore, it should be noted that the expansion may be virtual, so that the difference calculation process runs the pixels of the block and search area in different phases. Also, different interpolation methods in block expansion should be taken into account, at least when the search area is not a multiple of the block.

The function between the k×l sized search area S and the expanded block B may be expressed as an error block E:

$$E(i,j)=|B(i,j)-S(i,j)|, \quad (1)$$

where i runs from 0 to k−1 and j runs from 0 to l−1. Moreover, the topographic motion map T that fills the motion register may be expressed as $$T(i,j) = \sum_{i=1}^{n} E_i(i,j), \quad (2)$$

where the frame is divided into n blocks. These blocks can overlap and their union need not cover the entire frame, so feature detection can be applied. Other functions may also be used, such as quadratic functions, which are also efficient in motion estimation algorithms.

Figure 1B:
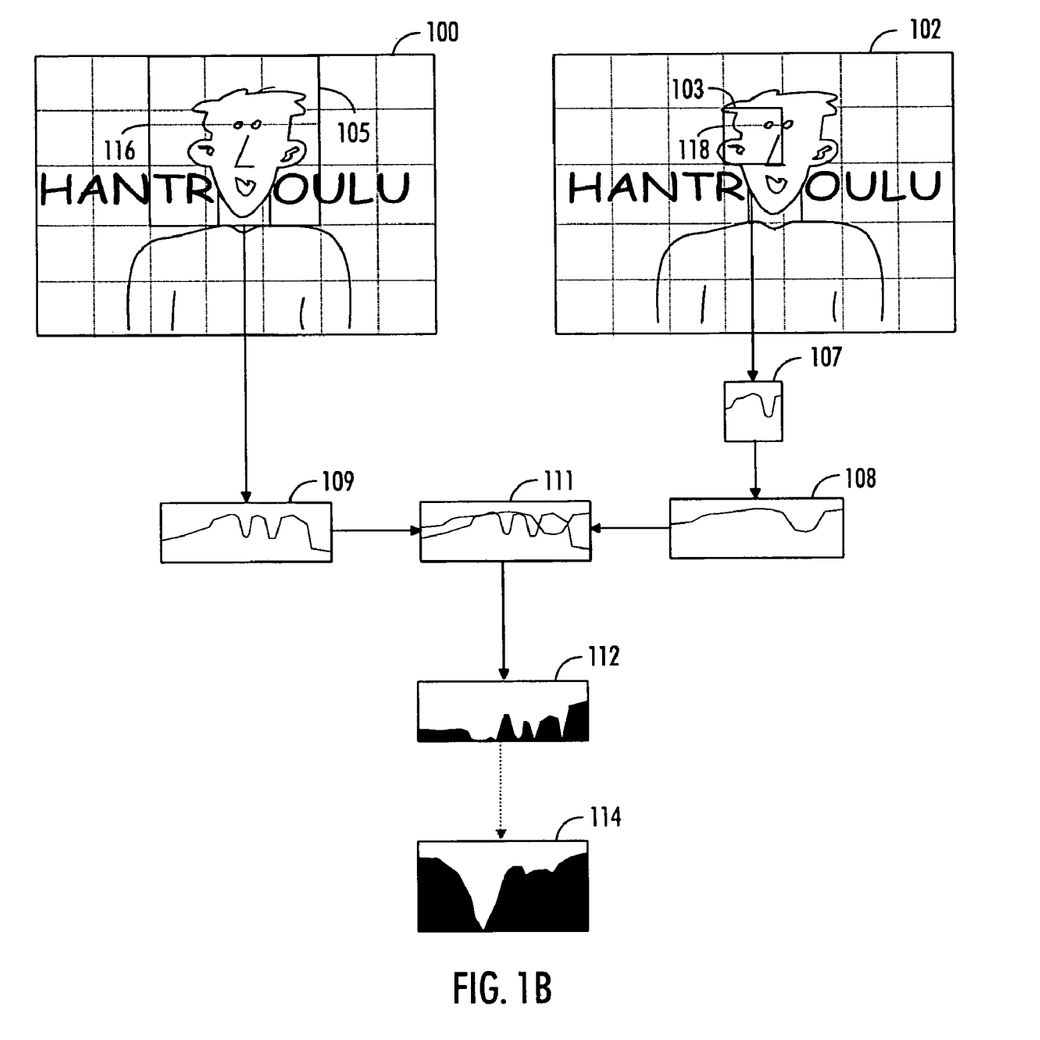
FIG. 1B illustrates the method's theory in practice.

Based on the configuration of FIG. 1A, FIG. 1B illustrates how the previously explained theory works in practice. Again, 102 illustrates a present frame with a person in it and 100 illustrates a previous frame where the person is in a slightly different position. For the sake of clarity, only a cross section 118 of luminance data 107 at the person's eye level is shown, when a block 103 is processed. The corresponding eye-level cross section 116 is selected inside a search area 105, and the cross section 116 of luminance data 109 is shown. The expansion of 107 is shown as 108. These two luminance data elements 108, 109 are combined as 111, where the absolute difference is calculated and added into a motion register 112. The motion register gathers the difference information of every block and search area and the topographic map of motion grows block by block. Finally, after every block is processed, a motion register 114 shows where the global motion vector is. The map of a block does not necessarily show exactly where the global motion vector is, because the map 112 may contain several minimum values, i.e. possible candidates for a motion vector. In the places where the volume of the map grows larger, the possibility for the existence of a motion vector decreases.

Figure 2:
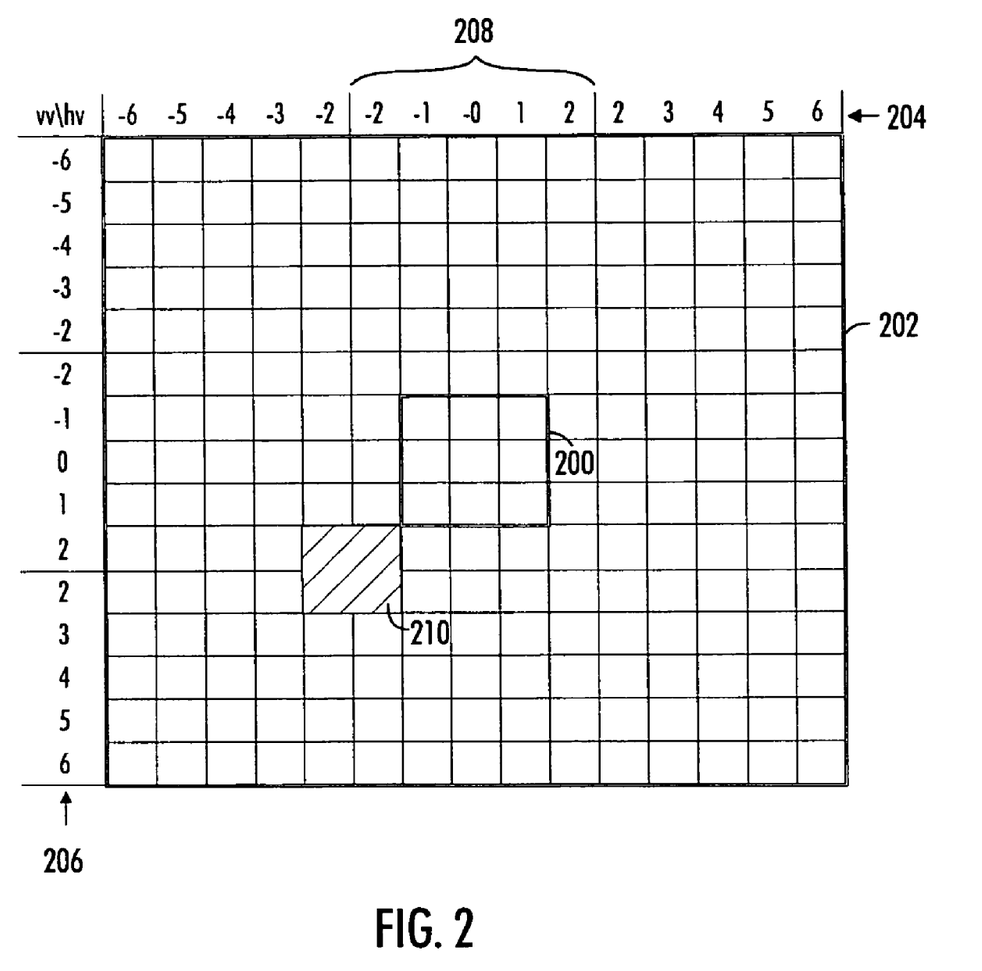
FIG. 2 is a table illustrating the relation between a motion map and motion vectors.

FIG. 2 shows the connection between the topographic map in the motion register and motion vectors as a chart. The block size 200 is 3×3 pixels and the search area 202 is 15×15 pixels. What is noteworthy here, is the periodic character of the motion vectors, which is shown in the edges of the chart: top values 204 stand for horizontal motion vectors and left values 206 stand for vertical motion vectors. The length of the motion vector period 208 is the rate between the sizes of the block and the search area. Here, the period is 5=15/3. This means that there will be repeating values in the topographic map. For example, there is an area of four values 210 that all point to the same vector (2, −2). This can be eliminated by combining all four values into their mean value while filling the map or afterwards, for example. The location of the map's minimum value shows the motion vector, which can easily be read from the chart's edge values, or calculated in an application.

The minimum value can be filtered from the map by a simple matrix filter, for example $$F = \begin{bmatrix} 1 & 2 & 1 \\ 2 & 4 & 2 \\ 1 & 2 & 1 \end{bmatrix} / 16, \quad (3)$$

which proved to be efficient in the simulations of the method. The minimum value may also be found without filtering or with a different filter. However, filtering is assumed to be a more secure way of finding the minimum value.

Figure 3:
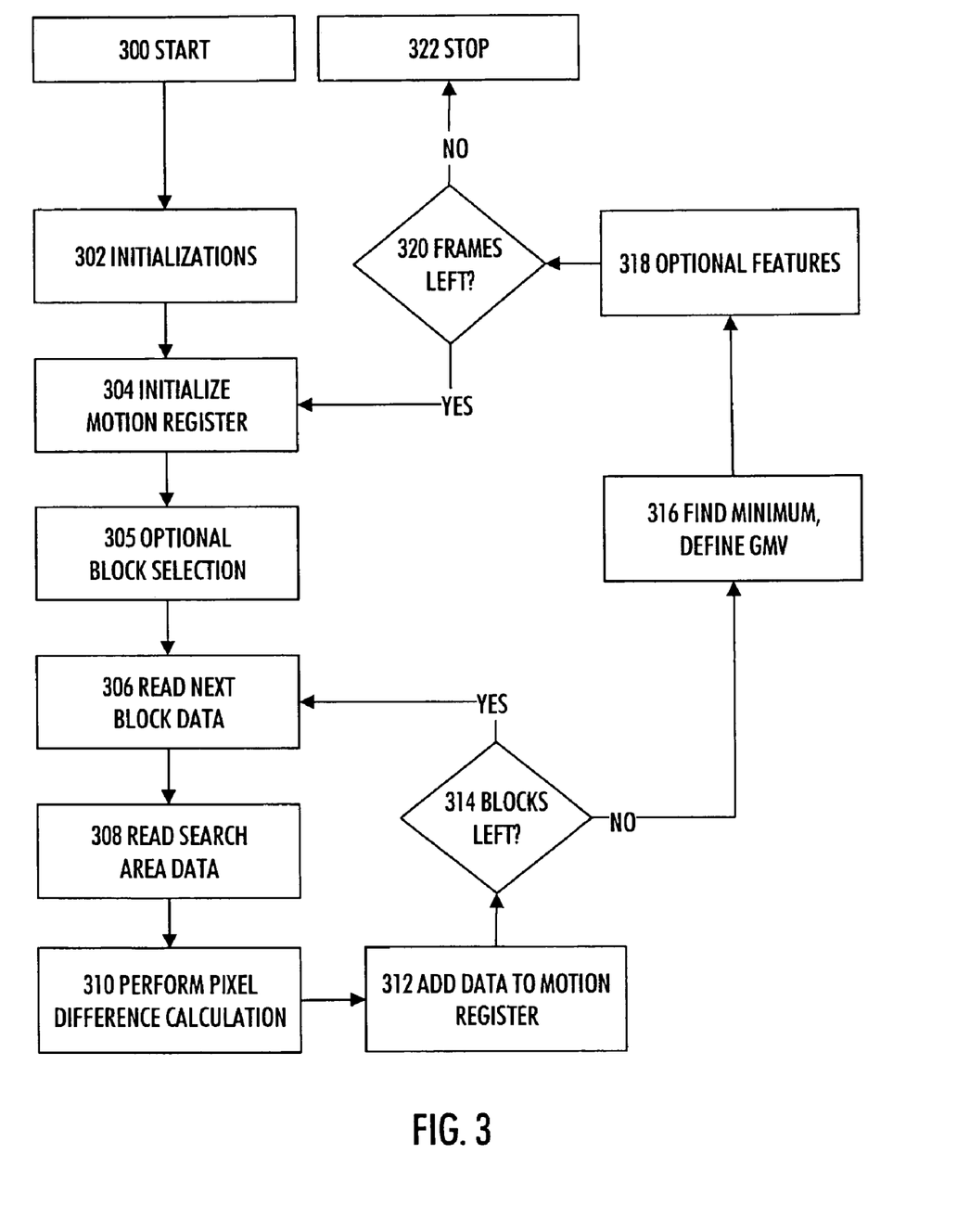
FIG. 3 is a block diagram illustrating the general motion definition method.

In the following, with reference to the flow chart shown in FIG. 3, a method for finding the global motion vector between two images is described. The method starts from 300. In 302, initializations are made; they may contain definitions for block size, search area size, etc. Next, in 304 the register for motion map is initialized to neutral. An optional block selection may be carried out in 305, with feature or detail detection, for example. In 306, the block data is read. The block data may be in luminance, chrominances Cb or Cr, red, blue, or in whatever digital color format. In 308, the search area data is read from the other image around the position of the block. The block is then (virtually) enlarged to the size of the search area and their difference is calculated pixel by pixel in 310, and the difference is then saved in the motion register 312. The loop 306, 308, 310, and 312 repeats until there are no more blocks left 314. In 316, the minimum value is searched from the motion register and a general motion vector is then defined with it. When the general motion vector is known, an optional feature 318 follows, which may be for example stabilization or mosaic image forming. The method loops frame pairs until there are no more frames left 320, whereupon the method is stopped in 322.

Figure 4A:
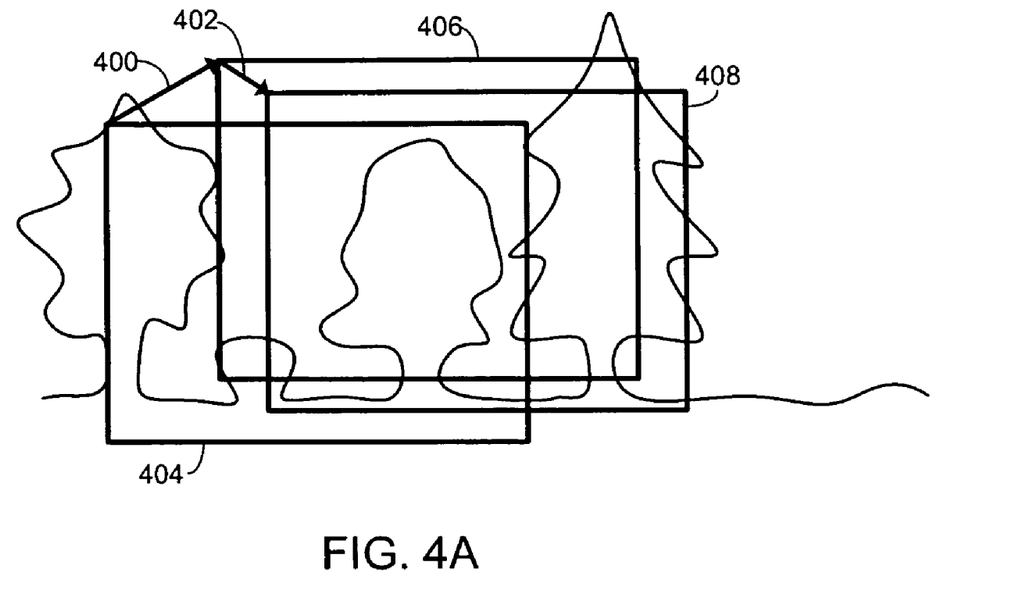
FIGS. 4A and 4B illustrate forming of a mosaic image and reference image selection.
Figure 4B:
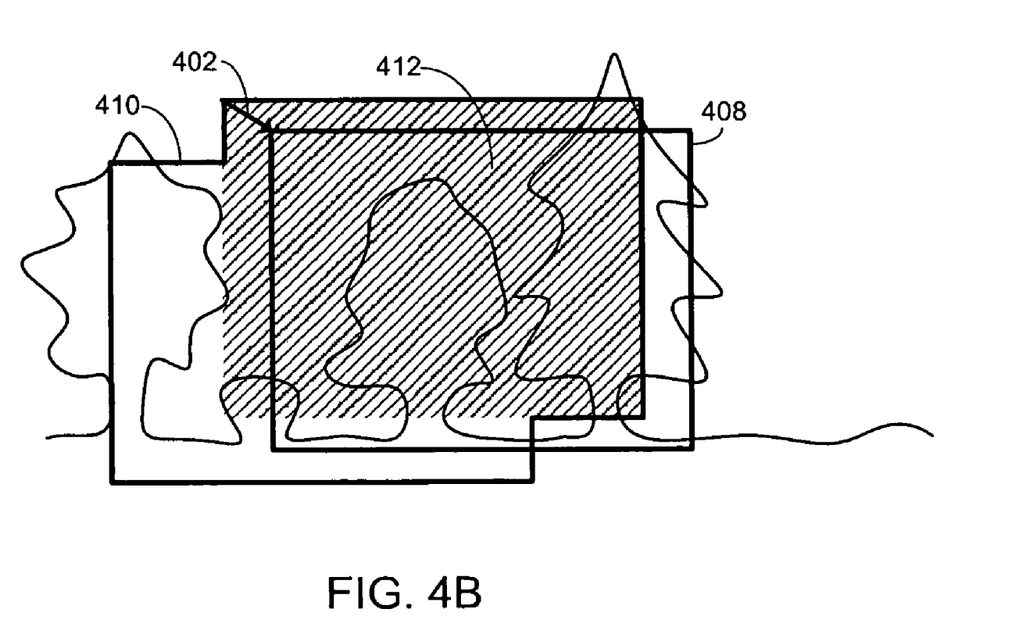

FIGS. 4A and 4B demonstrate the forming of a mosaic or panoramic image and the selection of the reference frame. FIG. 4A describes a situation where a panoramic or mosaic image of a forest is made. As one shoots the scene, global motion vectors 400, 402 of the consecutive images 404, 406, 408 are achieved as was explained above. At first, the frame 404 is obtained and set as a reference frame. Then, a frame 406 is obtained and a global motion vector 400 is calculated. With the motion vector 400 the relative locations of the frames 404 and 406 are known and a mosaic image can be made. After mosaicing, the frame 406 is set as a reference frame and a frame 408 is obtained as a new image. Next, a global motion vector 402 is calculated and the image 408 can be mosaiced with the previous mosaic (formed from the frames 404 and 406). Depending on the embodiment, the previous mosaic can also be used as a reference frame. This is illustrated in FIG. 4B, where the frames 404 and 406 are combined into a mosaic image 410 and an area 412 of it is used as a reference frame instead of the frame 406.

After the relative locations are identified, how are the images combined into a mosaic then? Prior art describes an almost infinite number of different melting and combining methods and thus the skilled person easily accomplishes this task. Anyhow, stitching methods do not work very well, the problem being that they distort the stitched area of images while perspective errors accumulate in certain segments of the panorama. Preferred are the melting methods and methods where the mosaic is combined from non-overlapping areas or segments taken from each frame.

Figure 5:
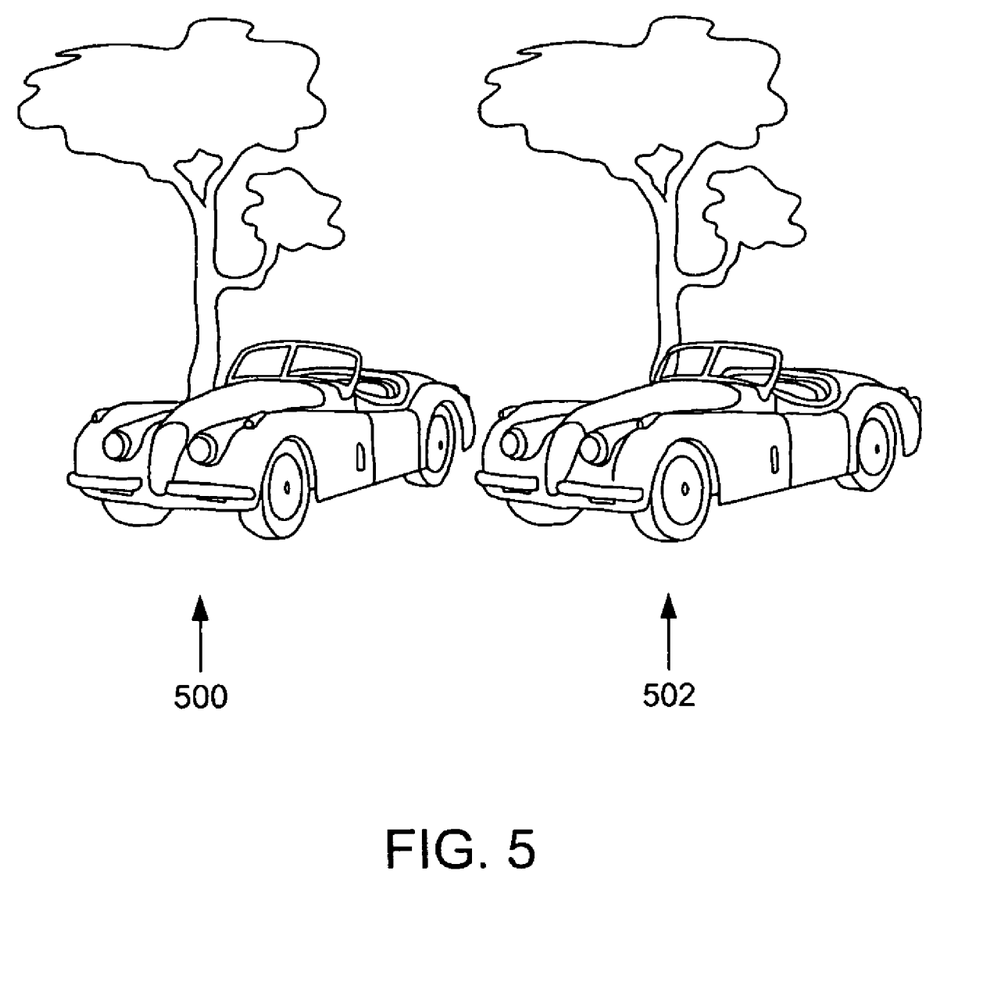
FIG. 5 is a 3D-stereo picture.

FIG. 5 represents two beautiful Jaguars (Model XK 120 from 1948). Actually it represents only one beautiful Jaguar, for the image is a stereo picture having an own image for each eye. This stereo picture is a parallel sight picture, meaning that the left Jaguar 500 is for the left eye and the right Jaguar 502 is for the right eye, together forming a 3D-picture of the old Jaguar. Besides parallel sight stereo pictures, cross sight pictures achieved by changing the image order also exist.

Figure 6:
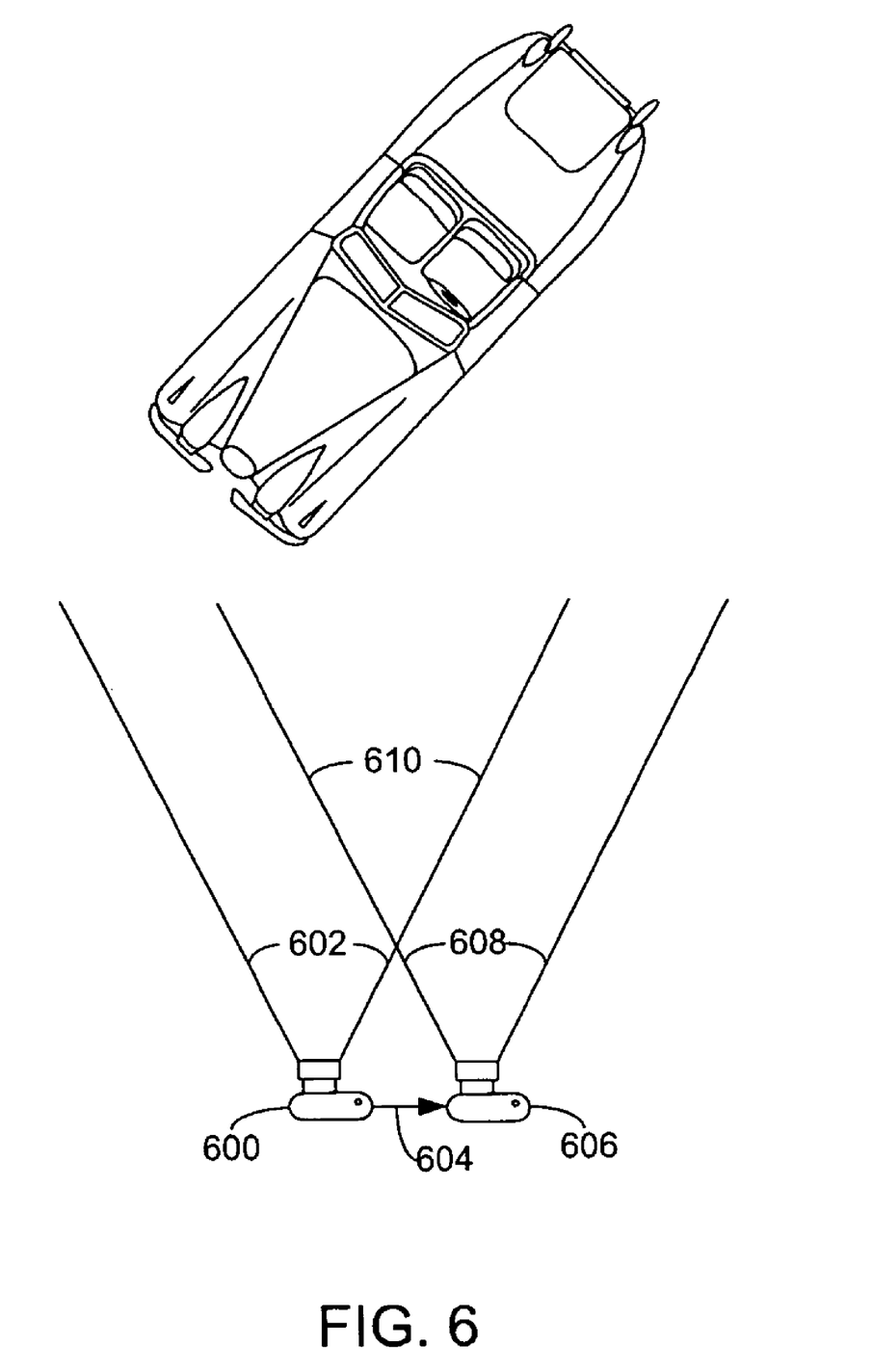
FIG. 6 describes the method of creating a 3D-panorama.

The method of making a panoramic 3D-picture is shown in FIG. 6. While shooting the panoramic image of the scene including the old Jaguar, at certain moment 600 the camera takes a picture of a view 602. Then the camera moves to the right 604, taking consecutive pictures at the same time, and at the moment 606 the camera shoots a view 608. Let us compare the taken pictures 602 and 608. They both include the scene with the Jaguar, but from a different viewpoint. The other noteworthy thing is that in the picture 602 the Jaguar is on the right side of the image, and in the picture 608 the Jaguar is on the left side. Together these images 602, 608 contain a view 610, the overlapping area from two different viewpoints. This is a stereo picture and it may also be considered as a mosaic, for it contains pixels from two individual images 602 and 608 and is greater in size than either of the images 602 and 608. Note that the different eye channels are shot at different moments in time: let us suppose that when the camera moves to the right 604 it shoots 49 images. So the right eye channel 608 is taken 50 images later than the left eye channel 602. To cancel this time error, the channels may be synchronized by 50 images. The time error can be cancelled by measuring a global motion vector between the channels: when the channels meet in horizontal dimension, they are synchronized. On the other hand, if no mosaicing is done, global motion vectors are not needed, unless images are stabilized first. This is explained more closely below.

For a successive photographing of a 3D-panorama, there is only one basic condition: The camera needs to move with some radius, or in other words, it may not rotate but circle. So the 3D-panoramic shooting process is as follows: The user starts the application and shoots the target by moving the camera to the left or to the right. The implemented 3D-panorama application measures global motion vectors for each incoming image and forms two different mosaics—one for both eye—from the opposite edges of images. Finally, 3D-panoramas may be encoded with jpeg, for instance. The 3D-panorama may also be saved as a video. Even if video requires more memory, its advantage is often a higher image quality of the mosaic image. Mosaicing weakens the image quality almost with no exceptions: when several images are combined into one, information is lost.

Figure 7:
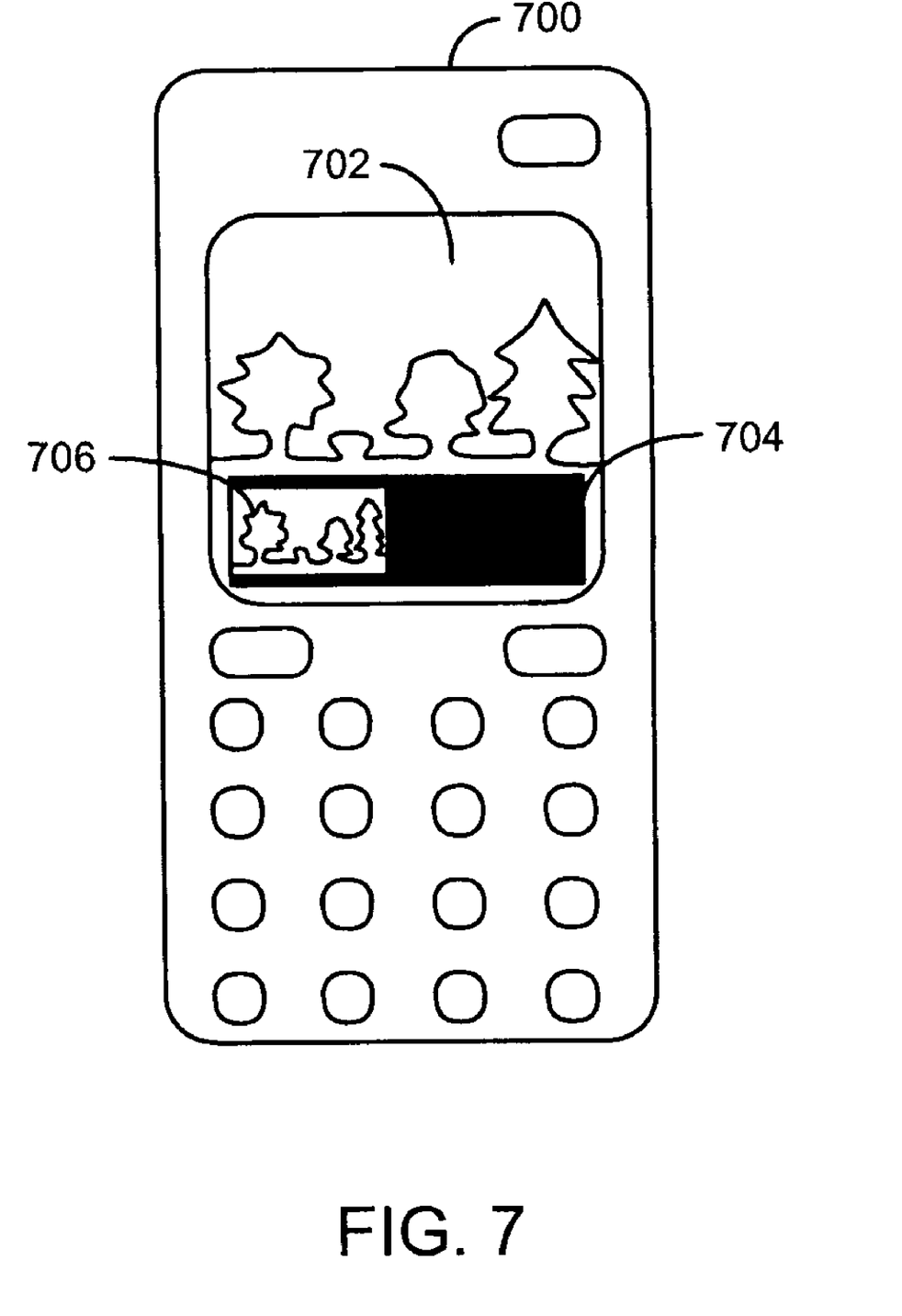
FIG. 7 demonstrates an instructive display in a mobile phone.

FIG. 7 demonstrates one possible embodiment of the invention—a common mobile phone 700 with a camera and a display 702 that shows the scene that the camera is shooting. As the user starts the application, the camera starts to shoot consecutive images, video, or single images with a high frequency. The first task is to count global motion vectors, which may be used in stabilization first. Next, the stabilized images are taken into mosaicing. In the display 702 there is a box 704 representing the mosaic to be created in a minimized size (initialized with a black color). So the box 704 represents the size of the mosaic that is allocated to the phone 700. Inside the box 704 is visualized in real time the progress of the shot mosaic 706, also in a minimized size. The box 704 and a panorama 706 guide the user to move the camera and fill the whole mosaic. The application deals with images and forms the mosaic that is stored in a memory of the phone. After the mosaic image is made, it may be encoded for example into a jpeg-image in order to save memory.

Figure 8:
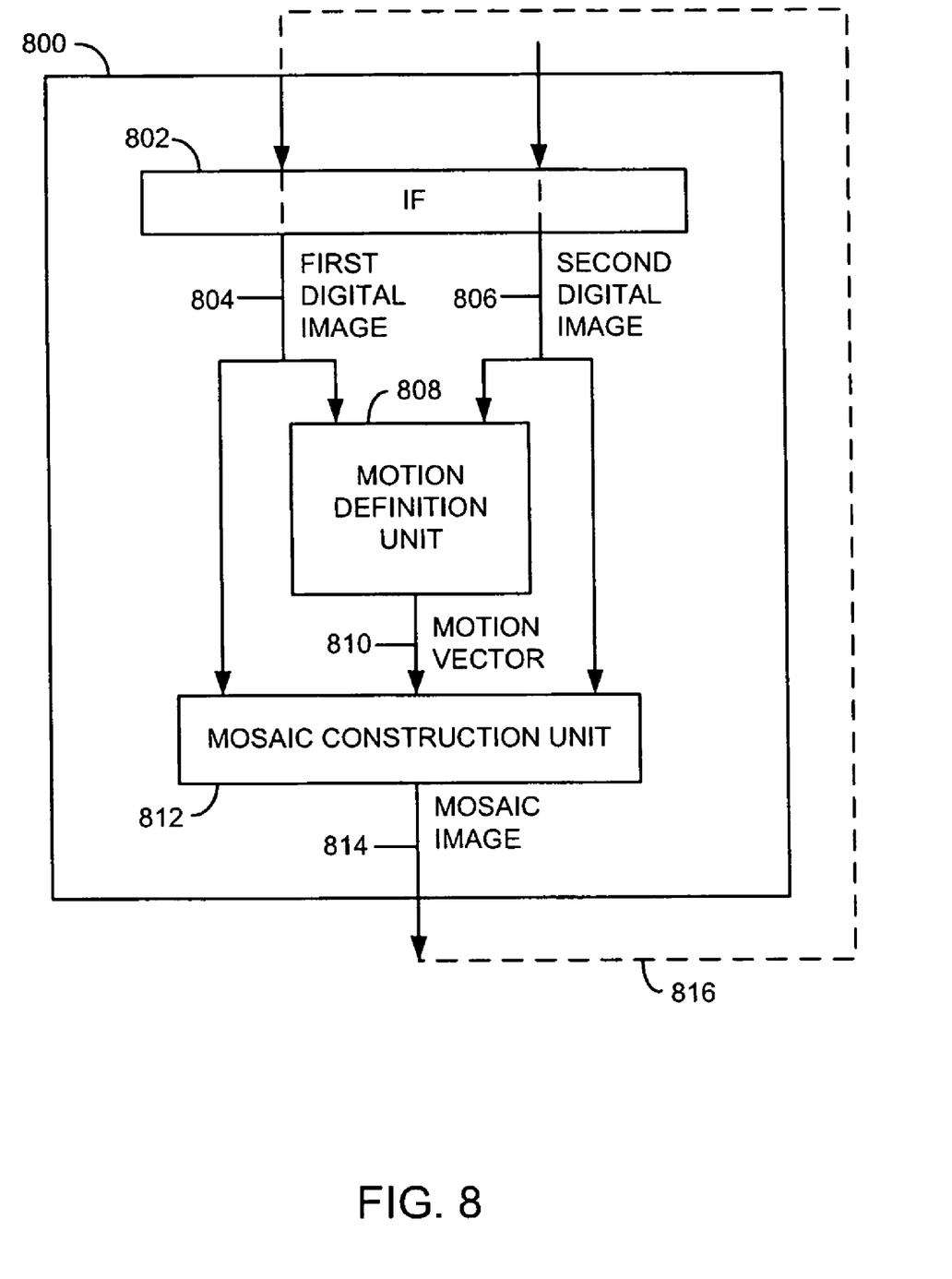
FIG. 8 illustrates an apparatus.

FIG. 8 illustrates an apparatus 800. The apparatus may be a (part of a) digital image processing apparatus. Such apparatuses include various subscriber terminals, user equipment, and other similar portable equipment, with or without a digital camera. However, the apparatus 800 is not limited to these examples, but it may be embedded in any electronic equipment where the described mosaic image formation may be implemented.

The apparatus 800 comprises an interface 802 configured to obtain a first digital image 804 and a second digital image 806.

The apparatus 800 also comprises a motion definition unit 808 configured to define a global motion vector 810 between the first digital image 804 and the second digital image 806.

The apparatus 800 further comprises a mosaic construction unit 812 configured to combine a mosaic image 814 from the first digital image 804 and the second digital image 806 utilizing the relative locations of the first 804 and second 806 digital images with each other as expressed by the global motion vector 810.

As explained earlier, the motion definition unit 808 may be configured to define at least one block in the first digital image 804, to define for each block a search area in the second digital image 806, the search area being larger than the block, to map the block and its search area to an equal size, to calculate pixelwise errors between each block and its search area that are mapped to an equal size, to collect the errors into a motion register, and to define a motion (vector) 810 between the first digital image and the second digital image by utilizing the motion register.

As explained earlier, the apparatus 800 may comprise a display 702 configured to show the progress of the mosaic combining and guide the user through the mosaic combining process.

FIG. 8 also illustrates, with reference numeral 816, that the apparatus 800 may be configured to recursively combine the mosaic image from a plurality of first and second digital images.

The apparatus 800 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the interface 802, the motion definition unit 808, and the mosaic construction unit 812 described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The interface 802, the motion definition unit 808, and the mosaic construction unit 812 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 800, necessary processing capacity, production costs, and production volumes, for example.

Figure 9:
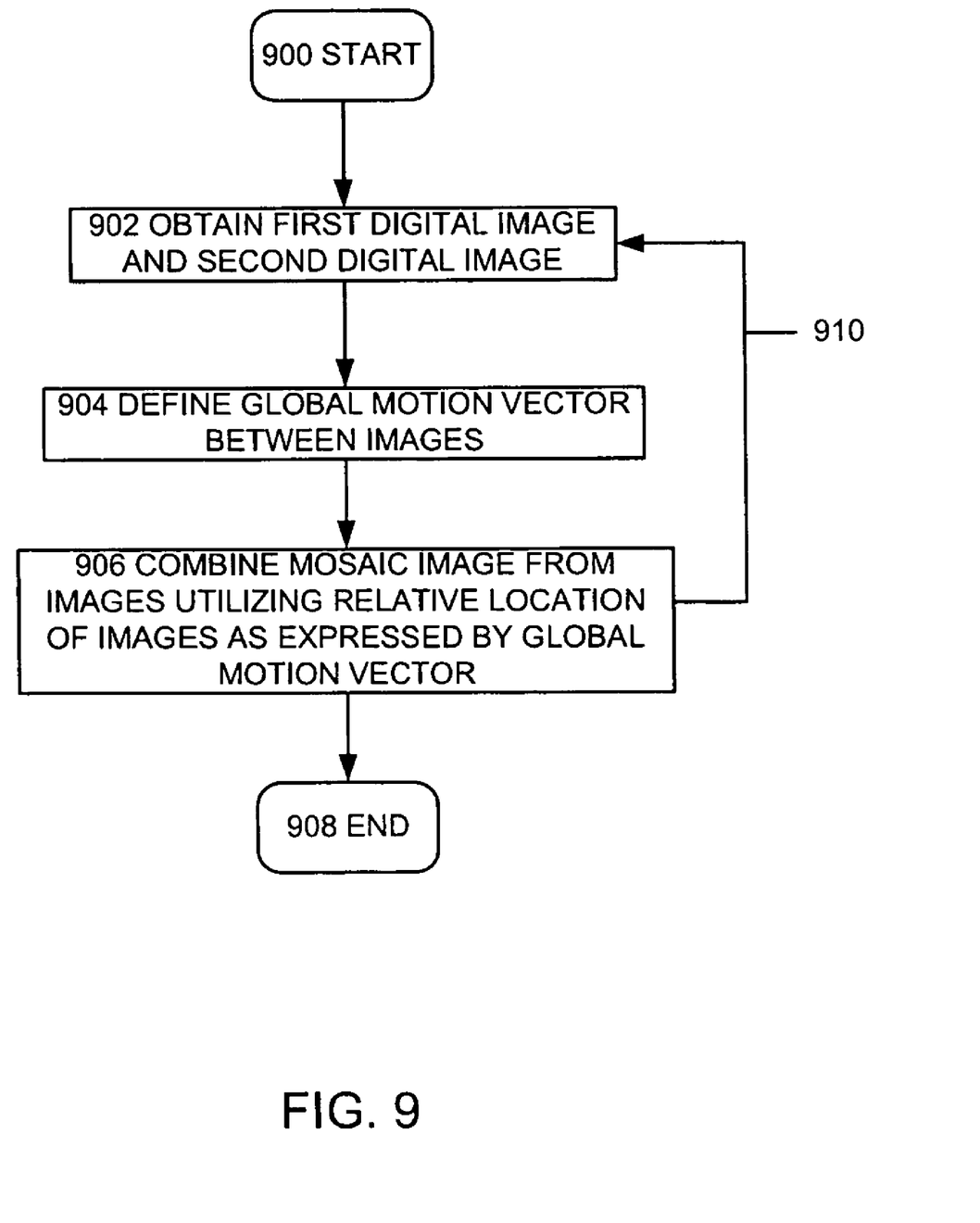
FIG. 9 illustrates a method.

Next, a method will be described with reference to FIG. 9. The method relates to digital mosaic image construction. The method starts in 900.

In 902, a first digital image and a second digital image are obtained.

In 904, a global motion vector between the first digital image and the second digital image is defined.

In 906, a mosaic image is combined from the first digital image and the second digital image utilizing the relative locations of the first and second digital images with each other as expressed by the global motion vector.

The method ends in 908, or, as illustrated by the reference numeral 910, the operations may be performed recursively in order to combine the mosaic image from a plurality of first and second digital images.

It should be noted that no special order of operations is required in the method, except where necessary due to the logical requirements for the processing order.

The formerly described details of the digital mosaic image construction may be applied to the method as well.

Even though the invention is described above with reference to an example according to the accompanying drawings, it is clear that the invention is not restricted thereto but can be modified in several ways within the scope of the appended claims.

The invention claimed is:

1. An apparatus comprising:
    an interface configured to obtain a first digital image and a second digital image;
    a motion definition unit configured to define a global motion vector between the first digital image and the second digital image; and
    a mosaic construction unit configured to combine a mosaic image from the first digital image and the second digital image utilizing the relative locations of the first and second digital images with each other as expressed by the global motion vector,
    wherein the motion definition unit is configured to define at least one block in the first digital image, to define for each block a search area in the second digital image, the search area being larger than the block, to map the block and its search area to an equal size, to calculate pixelwise errors between each block and its search area that are mapped to an equal size, to collect the errors into a motion register, and to define a motion between the first digital image and the second digital image by utilizing the motion register.

2. The apparatus of claim 1, further comprising a display configured to show the progress of the mosaic combining and guide the user through the mosaic combining process.

3. The apparatus of claim 1, wherein the apparatus is configured to recursively combine the mosaic image from a plurality of first and second digital images.

4. A method comprising:
    obtaining a first digital image and a second digital image;
    defining a global motion vector between the first digital image and the second digital image; and
    combining a mosaic image from the first digital image and the second digital image utilizing the relative locations of the first and second digital images with each other as expressed by the global motion vector,
    wherein the defining the global motion vector comprises:
    defining at least one block in the first digital image;
    defining for each block a search area in the second digital image, the search area being larger than the block;
    mapping the block and its search area to an equal size;
    calculating pixelwise errors between each block and its search area that are mapped to an equal size;
    collecting the errors into a motion register;
    defining a motion between the first digital image and the second digital image by utilizing the motion register.

5. The method of claim 4, further comprising:
    showing the progress of the mosaic combining; and
    guiding the user through the mosaic combining process.

6. The method of claim 4, wherein the operations are performed recursively in order to combine the mosaic image from a plurality of first and second digital images.

7. An apparatus comprising:
    means for obtaining a first digital image and a second digital image;
    means for defining a global motion vector between the first digital image and the second digital image; and
    means for combining a mosaic image from the first digital image and the second digital image utilizing the relative locations of the first and second digital images with each other as expressed by the global motion vector,
    wherein the means for defining a global motion vector is configured to define at least one block in the first digital image, to define for each block a search area in the second digital image, the search area being larger than the block, to map the block and its search area to an equal size, to calculate pixelwise errors between each block and its search area that are mapped to an equal size, to collect the errors into a motion register, and to define a motion between the first digital image and the second digital image by utilizing the motion register.

8. A computer program tangibly embodied on a computer readable medium, comprising program instructions which, when loaded into an electronic apparatus, comprise:
    an interface configured to obtain a first digital image and a second digital image;
    a motion definition unit configured to define a global motion vector between the first digital image and the second digital image; and
    a mosaic construction unit configured to combine a mosaic image from the first digital image and the second digital image utilizing the relative locations of the first and second digital images with each other as expressed by the global motion vector,
    wherein the motion definition unit is configured to define at least one block in the first digital image, to define for each block a search area in the second digital image, the search area being larger than the block, to map the block and its search area to an equal size, to calculate pixelwise errors between each block and its search area that are mapped to an equal size, to collect the errors into a motion register, and to define a motion between the first digital image and the second digital image by utilizing the motion register.

9. An integrated circuit, comprising:
    an interface block configured to obtain a first digital image and a second digital image;
    a motion definition block configured to define a global motion vector between the first digital image and the second digital image; and
    a mosaic construction block configured to combine a mosaic image from the first digital image and the second digital image utilizing the relative locations of the first and second digital images with each other as expressed by the global motion vector, wherein the motion definition block is configured to define at least one block in the first digital image, to define for each block a search area in the second digital image, the search area being larger than the block, to map the block and its search area to an equal size, to calculate pixelwise errors between each block and its search area that are mapped to an equal size, to collect the errors into a motion register, and to define a motion between the first digital image and the second digital image by utilizing the motion register.

* * * * *